AIR CONDITIONED DISPLAY COMPARTMENT AND METHOD

Original Filed Aug. 30, 1956 3 Sheets-Sheet 1

INVENTOR.
EDWARD W. SIMONS
BY
Boyken, Mohler & Wood
ATTORNEYS

AIR CONDITIONED DISPLAY COMPARTMENT AND METHOD

Original Filed Aug. 30, 1956 3 Sheets-Sheet 2

INVENTOR.
EDWARD W. SIMONS
BY
Bayken, Mohler & Wood
ATTORNEYS

AIR CONDITIONED DISPLAY COMPARTMENT AND METHOD

Original Filed Aug. 30, 1956 3 Sheets-Sheet 3

INVENTOR.
EDWARD W. SIMONS
BY
Boyken, Mohler & Wood
ATTORNEYS

United States Patent Office

Re. 27,566
Reissued Jan. 23, 1973

27,566
AIR CONDITIONED DISPLAY COMPARTMENT AND METHOD

Edward W. Simons, Mill Valley, Calif., assignor to Dualjet Corporation

Original No. 2,862,369, dated Dec. 2, 1958, Ser. No. 607,112, Aug. 30, 1956. Application for reissue Sept. 28, 1971, Ser. No. 184,643
Int. Cl. F25d *17/06*
U.S. Cl. 62—89 14 Claims

Matter enclosed in heavy brackets [ ] appears in the original patent but forms no part of this reissue specification; matter printed in italics indicates the additions made by reissue.

*ABSTRACT OF THE DISCLOSURE*

*A refrigerated upright display case comprising a walled compartment having a generally vertical, open side defined by a pair of spaced, opposed edges, a pair of side-by-side nozzles extending along one of said edges for issuing parallel, contacting curtains of air across said open side, a pair of fans for generating said curtains respectively connected to said nozzles by a pair of conduits, refrigerating means for refrigerating the air circulated by the one of said fans connected to the one of said nozzles adjacent the interior of said compartments, and a return conduit extending along the other of said edges for receiving the curtain issued from said one nozzle and conducting it to said one fan, the conduit connecting said one fan and said one nozzle and said return conduit extending around and in contact with the walls of said compartment and a portion of the air of the curtain issued by said one nozzle is circulated within the compartment thereby refrigerating the interior of said compartment.*

This invention relates to apparatus and a method for isolating the interior of a compartment or the like from the influence of the surrounding atmosphere.

One form of the invention herein described is useful in the field of refrigerated display cases for frozen food products where it has been found desirable to display such products in open cases in stores so that the purchaser may simply pick up the item he wishes from the case without having to open and close a door or other closure.

In order to provide an open display case it has heretofore been the practice to make the cases in the form of a box with an open top. Conventionally these boxes extend from the floor to perhaps waist level and the food items are stacked therein. The purchaser must then reach down through the open top and into the box to select the desired item and often must rearrange the stacked items in making his choice.

It has been thought necessary, however, to construct such display cases in this manner to avoid undue movement of air from the interior of the box, for, obviously, the heavier, refrigerated air in the box tends to remain therein rather than rising out of the open top. Were the box open on the side, the interior conditioned air would likely spill out on the floor and be replaced by warmer atmospheric air thereby destroying the refrigeration effect of the case.

From the standpoint of the purchaser the conventional display case, of necessity open only at the top, may be particularly awkward. For instance, the labels on only the top packages can be seen and it is often necessary to reach down in the case to bring forth the desired item or to appraise the available selection. This, of course, disrupts the display. Likewise, the mere act of picking an item from the conventional case involves bending over and reaching down into the case since the same cannot be placed at eye or arm level.

Conventional display cases of this type also require a relatively large amount of floor space compared to the number of items displayed. In a small store the crowding of such a case may substantially reduce its practicality.

It is therefore an object of this invention to overcome many of the disadvantages of prior art display cases.

Similar difficulties may attend the use of cases or compartments in which it is desired to maintain air conditions other than atmospheric, but which, rather than being refrigerated, are heated, humidified, etc. The present invention also contemplates such applications of the invention.

It is another object of this invention to provide a novel method of isolating the interior of a compartment from the influence of atmospheric conditions.

Still another object of this invention is the provision of a compartment having a side open to the atmosphere in which the interior is conditioned and atmospheric air is prevented from entering said open side.

A further object of this invention is the provision of a compartment having an open side and means for shielding said open side against the passage of air into or out of said compartment through said open side, but which means does not interfere with access to the interior of said compartment.

Other objects and advantages will become apparent from the following description taken in connection with the accompanying drawings, in which.

Figure 2:
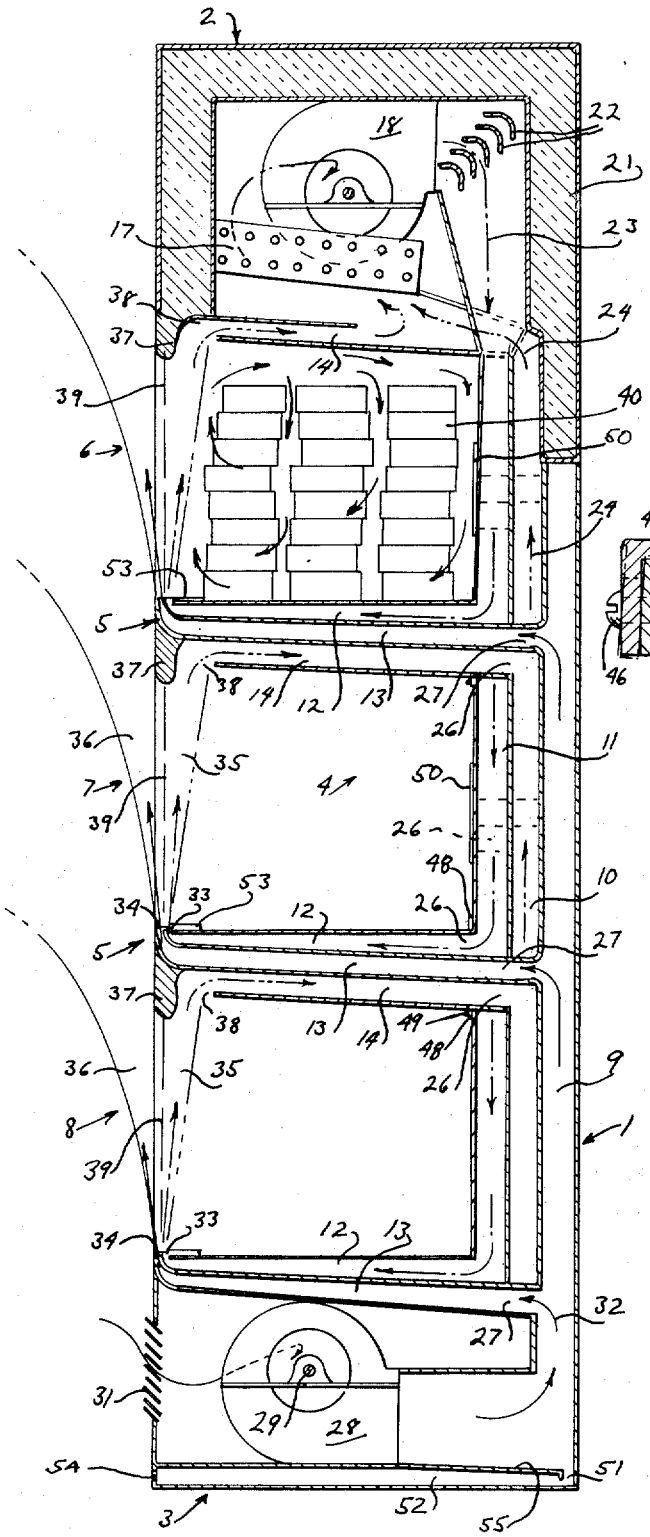
Fig. 2 is a cross-sectional view taken generally along line 2—2 of Fig 1.

In detail, this invention is illustrated in the form of a display case or cabinet for refrigerated food products or the like. The cabinet is provided with a rear wall 1, a top and bottom 2 and 3, and opposed end walls 4. The front or display side of the cabinet is open to the atmosphere as shown in Fig. 2. The cabinet is also provided with a plurality of shelves 5 intermediate the top and bottom, in much the same manner as a bookcase. These shelves divide the cabinet into a plurality of separate compartments which are generally similar in construction.

In effect, the display case is in the form of several open sided compartments stacked one upon the other. In Fig. 2 these compartments are denoted by the reference numeral 6, for the upper compartment bounded by the top 2, rear wall 1, and the upper shelf 5; numeral 7, for the central compartment bounded by the shelves 5 and rear wall 1; and numeral 8 for the lower compartment bounded by the lower shelf 5, rear wall 1, and the bottom 3 of the compartment. It is obvious that the ends of the compartments are formed by end walls 4 of the cabinet.

Rear wall 1 is seen to comprise three separate air chambers 9, 10, 11 in side by side relation. Likewise, each shelf 5 incorporates three overlying air ducts or conduits 12, 13, 14. A similar duct 14 is provided at the upper side of upper compartment 6 and the bottom of lower compartment 8 is formed to provide similar, overlying ducts 12, 13.

Housed in the upper end of the display cabinet are air conditioning and circulating means comprising refrigerating coils 17 and preferably a plurality of fans 18. Fans 18 may all be mounted on the same shaft 19 (Fig. 1) to be driven by a motor 20. Since the conditioning or chilling of the air to be circulated in apparatus of this invention is accomplished in the upper part of the cabinet housing coils 17 and fans 18, the same should be enclosed in insulation, as at 21. The output of fans 18 is guided downwardly by louvers 22 (Fig. 2) into air chamber 11 as shown by the dot-dash lines 23. The input air to fans 18 is drawn from chamber 10 as shown by dot-dot-dash lines 24.

It will later become obvious that the air circulating and conditioning means 17, 18 may be mounted in a unit separate from the display case and connected thereto by appropriate ducts. Similarly the case may be in the form of a single compartment if shelving is not desired.

Air chamber 11 communicates with each shelf duct 12 by means of an opening 25 through the inner wall of chamber 11. Similarly, chamber 10 communicates with each shelf duct 14 by means of a short cross duct 26 extending through chamber 11, with the exception of the uppermost duct 14 which opens into the chamber in which the refrigerating coils 17 and fans 18 are housed.

Figure 1:
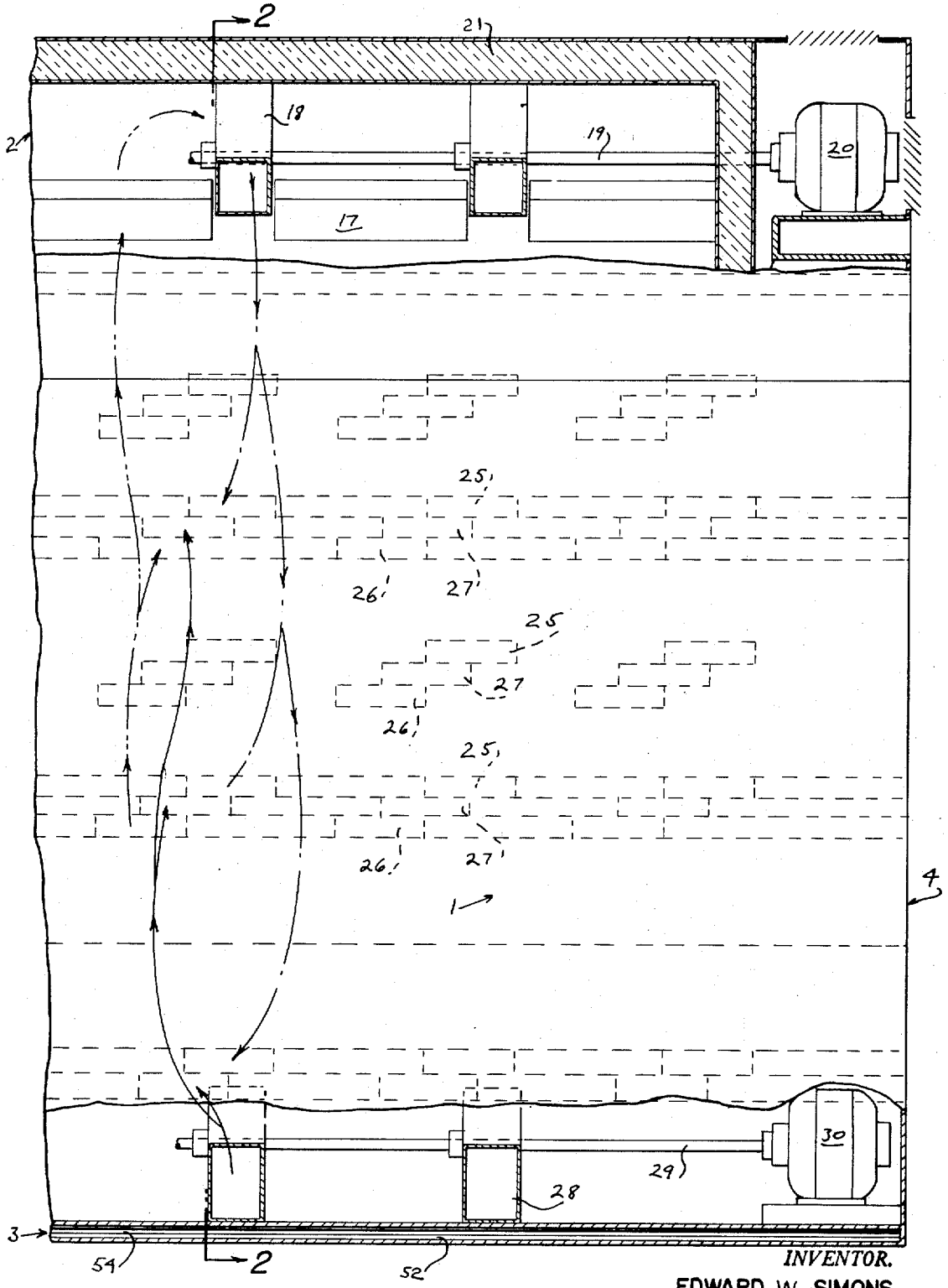
Fig. 1 is a rear elevational view of a display case constructed in accordance with this invention.

In the lower portion of the cabinet are mounted a plurality of air circulating fans 28 driven through a common shaft 29 by motor 30 (Fig. 1). The housing in which fans 28 are mounted is louvered, as at 31, so as to admit atmospheric air to said fans which circulate the same into air chamber 9 as denoted by solid line arrows 32. Chamber 9 communicates with each shelf duct 13 by means of a cross duct 27 which extends from chamber 9 through chambers 10 and 11 to each duct 13.

At the outer free ends of shelf ducts 12, 13 the same are formed with a pair of elongated upwardly directed nozzles 33, 34 (Figs. 2, 3) which extend along the lower edge of the open side of the compartments in side by side relationship. The air forced through ducts 12, 13 by fans 18, 28, respectively issues from said nozzles and moves upwardly across the open side of compartments 6, 7, 8 in a pair of adjoining layers of air 35, 36 (Fig. 2). Directly above each pair of nozzles 33, 34 is a downwardly projecting lip 37 which acts as a divider for maintaining the air layers separate. The outer layer 36, of atmospheric air circulated by fans 28, is directed outwardly of the compartments once it has passed over the open side thereof.

The inner layer 35, of chilled air circulated by fans 18, is directed into the open end 38 of return duct 14 adjacent each divider 37. As a consequence, the air circulated by fans 18 is first chilled by being pulled through refrigerating coils 17 and then directed through chamber 11, ducts 12, out of nozzles 33, across the open side of each compartment and back through ducts 14 and chamber 10 to return to fans 18.

It is seen, therefore, that of the two layers of air moving simultaneously across the open side of compartments 6, 7, 8, the inner layer 35 is conditioned or chilled air continuously recirculated by fans 18. The outer layer 36 is exterior or atmospheric air circulated by fans 28.

In a food display cabinet of the type described, the interior of compartments 6, 7, 8 is conditioned to a predetermined temperature which is desired to be maintained. The fact that chambers 11 and ducts 12 and 14, through which the chilled air is circulated, are adjacent the inner walls of the compartments assists in maintaining the desired predetermined temperature within the compartment.

The speeds at which the layers of air 35, 36 issue from nozzles 33, 34 is adjusted to the relation at which no substantial entrainment takes place between the layers. Layers 35, 36 adjoin each other along the nonentraining line 39 (Fig. 2), but there is little, if any, mixture between the two. The air layers 35, 36 therefore form a substantially continuous air curtain across the open side of compartments 6, 7, 8 and effectively isolate the interior of said compartments from the effects of the atmosphere.

Some small amount of air from inner layer 35 may enter the compartment, rather than being drawn into return duct 14, and circulate within the compartment, thus keeping the contents, such as food packages 40 (Fig. 2) "sweet" and at the desired temperature. The slight amount of cold air from layer 35 that may enter outer layer 36 will fall to the bottom of the room in which the display case is situated and will be later picked up by fans 28 and recirculated, thereby tending to reduce the temperature of outer layer 36.

The condition at which no substantial entrainment between layers 35, 36 takes place is characterized by substantially equal velocity of the layers. The adjustment of the speeds of the air issuing from the nozzles 33, 34 in order to achieve nonentrainment between the layers, may be easily accomplished by adjustment of the output of fans 18, 28.

Figure 3:
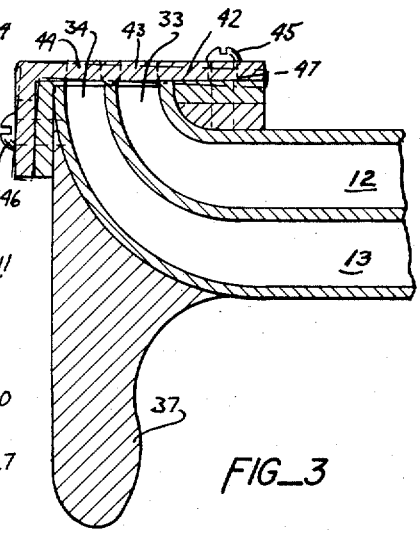
Fig. 3 is a greatly enlarged sectional view of an adjustable nozzle structure for the case of Fig. 2.
Figure 4:
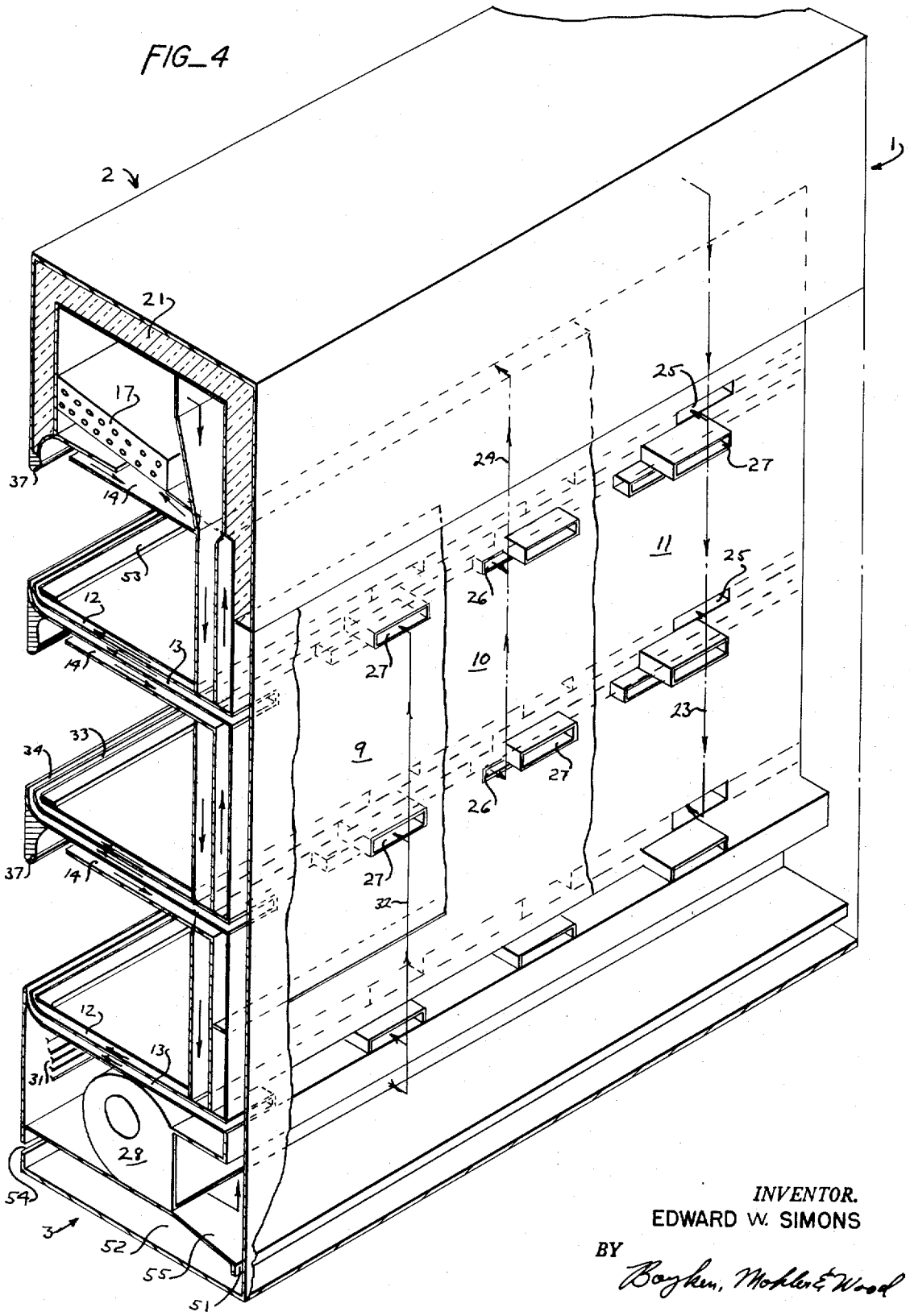
Fig. 4 is an isometric sectional view looking at the back of the case and the side thereof as if it were cut along line 2—2 of Fig. 1, with the back panels broken away to show structural details.

It is also desirable to provide for some adjustment of the direction of nozzles 33, 34 in the event that it becomes necessary to slightly change the direction of layers 35, 36 to obtain optimum efficiency. Fig. 3 illustrates a simple means for performing this function, comprising a plate 42 having elongated apertures 43, 44 therethrough superimposed over nozzles 33, 34 respectively. Plate 42 may be secured in this position by means of screws 45, 46 on opposite sides of said apertures. Opposite tightening and loosening of screws 45, 46 will cause plate 42 to rotate slightly from, for example, the solid line position of Fig. 3 to the dot-dash line position 47, thereby altering slightly the direction of issuance of the air layers 35, 36 from nozzles 33, 34 and apertures 43, 44.

It will also be noted that shelves 5 may be provided with flanges 48 (Fig. 2) so that the shelves may be removably secured in place, as by means of screws 49. Cross ducts 26, 27 and openings 25 may also be placed at intermediate locations and covered by a removable plate 50 which may be interchanged with the removable shelf. Flexibility is had in this manner so that the positioning of the shelves in the cabinet may be altered at will.

The display case shown and described may be constructed predominately of sheet metal and is preferably provided with an evacuated reflective space in the shelf panels in accordance with good refrigeration practice. Similarly, a high velocity evaporation jet 51 (Fig. 2) and a condensation evaporator 52 may be provided below fans 28 to trap out excess moisture in the atmospheric air circulated by said fans. Jet 51 is formed by an elongated by-pass opening extending across the back of the display cabinet near the bottom of rear wall 1. Opening 51 communicates between chamber 9 and evaporator space 52 which is vented to the atmosphere, as at 54.

A portion of the air circulated by fans 29 is forced at high velocity through jet 51 and evaporator 52 to evaporate and exhaust moisture condensing on the walls of chamber 9 and ducts 13 and draining into evaporator 52. It will be noted that the top panel 55 of evaporator 52 is slanted downwardly to the rear of the cabinet to facilitate such drainage.

When displaying food packages, such as 40, (Fig. 2) in a cabinet of this type it has been found desirable to provide a piling stud 53 adjacent inner nozzle 33 so that the packages will all be stacked in a position spaced inwardly from said nozzle so as to not interfere with the flow of air layer 35. The speed of the air layers 35, 36 issuing from nozzles 33, 34 determined most effective is in the neighborhood of 2000 feet per minute, but this speed may be varied generally between 500 and 4000 feet per minute without destroying the utility of the invention.

It will be understood, of course, that the principles involved in this invention may be applied to isolating the interior of various types of compartments, the conditioning of which may relate to temperature, humidity, or other factors. One of the principal advantages in the food display case described is the fact that the products 40 may be prominently displayed and at the same time the interior of the compartment is effectively shielded from atmospheric conditions without the necessity of providing a door or other solid closure across the open side of the compartment.

Although the invention has been described and illustrated in detail, such is not to be taken as restrictive thereof since it is obvious that modifications could be made therein without departing from the spirit and scope of the invention.

I claim:

[1. The method of isolating the interior of a compartment having an open side from the influence of ambient atmosphere and maintaining a predetermined air condition within said compartment other than atmospheric that comprises the steps of: conditioning the interior of said compartment to said desired condition and simultaneously moving a pair of parallel contacting layers of air across the open side of said compartment in the same direction at substantially equal speeds whereby no substantial entrainment takes place between said layers, one layer of said pair being approximately at said desired predetermined condition and defining a substantially continuous air curtain at said open side and next to said compartment, the other layer of said pair being ambient air and defining a continuous air curtain on the opposite side of said one layer from said compartment.]

[2. The method of isolating the interior of a compartment having an open side from the influence of ambient atmosphere and maintaining a predetermined air condition within said compartment other than atmospheric that comprises the steps of: conditioning the interior of said compartment to said desired condition and simultaneously moving a pair of parallel contacting layers of air across the open side of said compartment in the same direction at substantially equal speeds whereby no substantial entrainment takes place between said layers, one layer of said pair being approximately at said desired predetermined condition and defining a substantially continuous air curtain at said open side and next to said compartment, the other layer of said pair being ambient air and defining a continuous air curtain on the opposite side of said one layer from said compartment, said conditioning being accomplished by circulating a portion of the air of said one layer in the interior of said compartment.]

[3. The method of isolating the interior of a compartment having an open side from the influence of ambient atmosphere and maintaining a predetermined air condition within said compartment other than atmospheric that comprises the steps of: conditioning the interior of said compartment to said desired condition and simultaneously moving a pair of parallel contacting layers of air across the open side of said compartment in the same direction at substantially equal speeds whereby no substantial entrainment takes place between said layers, one layer of said pair being approximately at said desired predetermined condition and defining a substantially continuous air curtain at said open side and next to said compartment, the other layer of said pair being ambient air and defining a continuous air curtain on the opposite side of said one layer from said compartment.]

[4. The method of isolating the interior of a compartment having an open side from the influence of atmospheric temperature and maintaining a predetermined temperature within said compartment other than atmospheric temperature that comprises the steps of: conditioning the interior of said compartment to said desired predetermined temperature, and simultaneously moving a pair of parallel contacting layers of air across the open side of said compartment in the same direction at substantially equal speeds whereby no substantial entrainment takes place between said layers, one layer of said pair being approximately at said desired predetermined temperature and defining a substantially continuous air curtain at said open side and next to said compartment, the other layer of said pair being at atmospheric temperature and defining a continuous air curtain on the opposite side of said one layer from said compartment.]

5. The method of isolating the interior of a compartment having an open side from the influence of atmospheric temperature and maintaining a predetermined temperature within said compartment other than atmospheric temperature that comprises the steps of: (*a*) conditioning the interior of said compartment to said desired predetermined temperature, [and] (*b*) simultaneously moving a pair of parallel contacting layers of air across the open side of said compartment in the same direction at substantially equal speeds whereby no substantial entrainment takes place between said layers, one layer of said pair being approximately at said desired predetermined temperature and defining a substantially continuous air curtain at said open side and next to said compartment, the other layer of said pair being at atmospheric temperature and defining a continuous air curtain on the opposite side of said one layer from said compartment, and (*c*) circulating a portion of the air of said one layer through the interior of said compartment for maintaining fresh air therein.

6. The method of isolating the interior of a compartment having an open side from the influence of atmospheric temperature and maintaining a predetermined temperature within said compartment other than atmospheric temperature that comprises the steps of: (*a*) conditioning the interior of said compartment to said desired predetermined temperature, and (*b*) simultaneously moving a pair of parallel contacting layers of air across the open side of said compartment in the same direction at substantially equal speeds whereby no substantial entrainment takes place between said layers, one layer of said pair being approximately at said desired predetermined temperature and defining a substantially continuous air curtain at said open side and next to said compartment, the other layer of said pair being at atmospheric temperature and defining a continuous air curtain on the opposite side of said one layer from said compartment, and (*c*) then conducting the air of said one layer adjacent one or more of the walls of said compartment and back across said open side, and (*d*), conditioning the air of said one layer to maintain its said predetermined temperature before conducting it back across said open side.

7. The method [of isolating the interior of a compartment having an open side from the influence of atmospheric temperature and maintaining a predetermined temperature within said compartment other than atmospheric temperature that comprises the step of: conditioning the interior of said compartment to said desired predetermined temperature, and simultaneously moving a pair of parallel contacting layers of air across the open side of said compartment in the same direction at substantially equal speeds whereby no substantial entrainment takes place between said layers, one layer of said pair being approximately at said desired predetermined temperature and defining a substantially continuous air curtain at said open side and next to said compartment, the other layer of said pair being at atmospheric temperature and defining a continuous air curtain on the opposite side of said one layer from said compartment, and then conducting the air of said one layer adjacent one or more of the walls of said compartment and back across said open side, and conditioning the air of said one layer to maintain its said predetermined temperature before conducting it back across said open side, and] *according to claim 6 in-*

*cluding:* (*e*) exhausting said other layer to the atmosphere.

[8. An air conditioned display case comprising: a compartment having an open side, a pair of elongated nozzles in parallel, side-by-side relationship extending continuously along the length of one edge of said open side and directed toward an opposite edge thereof, a pair of air circulating means respectively connected to said nozzles for simultaneously forcing air outwardly thereof in a pair of parallel contacting layers across said open side of said compartment, and means for conditioning the air forced through the one of said nozzles that is adjacent the interior of said compartment.]

[9. An air conditioned display case comprising: a compartment having an open side, a pair of elongated nozzles in parallel, side-by-side relationship extending continuously along the length of one edge of said open side and directed toward an opposite edge thereof, a pair of air circulating means, first conduit means connecting one of said circulating means with the one of said nozzles adjacent the interior of said compartment and second conduit means connecting the other of said circulating means to the other of said nozzles for respectively conducting air to said nozzles for issuing therefrom in a pair of adjoining layers across said open side of said compartment, and return conduit means, open adjacent said opposite edge of said open side of said compartment, and extending to said one circulating means for conducting air from the one of said layers issuing from said one nozzle to said one air circulating means.]

[10. An air conditioned display case comprising: a compartment having an open side, a pair of elongated nozzles in parallel, side-by-side relationship extending continuously along the length of one edge of said open side and directed toward an opposite edge thereof, a pair of air circulating means, first conduit means connecting one of said circulating means with the one of said nozzles adjacent the interior of said compartment and second conduit means connecting the other of said circulating means to the other of said nozzles for respectively conducting air to said nozzles for issuing therefrom in a pair of adjoining layers across said open side of said compartment, return conduit means, open adjacent said opposite edge of said open side of said compartment, and extending to said one circulating means for conducting air from the one of said layers issuing from said one nozzle to said one air circulating means, and air conditioning means for conditioning the air circulated by said one circulating means.]

11. An air conditioned display case comprising: (*a*) a compartment having an open side, (*b*) a pair of elongated nozzles in parallel, side-by-side relationship extending continuously along the length of one edge of said open side and directed toward an opposite edge thereof, (*c*) a pair of air circulating means, (*d*) first conduit means connecting one of said circulating means with the one of said nozzles adjacent the interior of said compartment and second conduit means connecting the other of said circulating means to the other of said nozzles for respectively conducting air to said nozzles for issuing therefrom in a pair of adjoining layers across said open side of said compartment, (*e*) return conduit means, open adjacent said opposite edge of said open side of said compartment, and extending to said one circulating means for conducting air from the one of said layers issuing from said one nozzle to said one air circulating means, and (*f*) air conditioning means for conditioning the air circulated by said one circulating means, said first conduit means and said return conduit means extending along one or more of the walls of said compartment.

12. An air conditioned display case [comprising: a compartment having an open side, a pair of elongated nozzles in parallel, side-by-side relationship extending continuously along the length of one edge of said open side and directed toward an opposite edge thereof, a pair of air circulating means respectively connected to said nozzles for simultaneously forcing air outwardly thereof in a pair of adjoining layers across said open side of said compartment, and means for conditioning the air forced through the one of said nozzles that is adjacent the interior of said compartment, and] *according to claim 11 including:* (*g*) means for adjusting the direction of flow of said nozzles.

13. An air conditioned display case [comprising: a compartment having an open side, a pair of elongated nozzles in parallel, side-by-side relationship extending along one edge of said open side and directed toward an opposite edge thereof, a pair of air circulating means respectively connected to said nozzles for simultaneously forcing air outwardly thereof in a pair of adjoining layers across said open side of said compartment, and means for conditioning the air forced through the one of said nozzles that is adjacent the interior of said compartment, and] *according to claim 11 including:* (*g*) means for trapping and exhausting the excess moisture from the air forced through the other of said nozzles.

14. In an air conditioned, upright display case having a rear side wall, opposed end walls and top and bottom walls and an open front side opposite said rear wall, a pair of air circulating means, three air chambers formed adjacent said rear wall, the first and second of said chambers respectively communicating with the input and output sides of one of said pair of circulating means and the third said chamber communicating with the output side of the other of said circulating means the input side of which communicates with the atmosphere, air conditioning means associated with said one circulating means for conditioning the air circulated thereby, a plurality of vertically spaced, detachable shelves extending horizontally from said rear wall toward said open side, inner and outer elongated nozzles in parallel side-by-side relationship extending along the free edge of each of said shelves at said open side and directed upwardly toward the free edge of the shelf above said nozzles for issuing inner and outer adjoining layers of air respectively across said open side, a return duct carried by each of said shelves and extending from the rear edge thereof to an opening on the underside of said shelf adjacent the free edge thereof for receiving said inner layer of air issued by said inner nozzle, inner and outer nozzle ducts carried by each of said shelves and respectively extending from the rear edge thereof to said nozzles, connecting means provided at vertically spaced locations on said rear wall for respectively connecting said first, second, and third chambers to said return, inner and outer nozzle ducts of a shelf attached thereto, and means for blocking the connecting means not attached to a shelf.

15. An air conditioned display case [comprising: a compartment having an open side, a pair of elongated nozzles in parallel, side-by-side relationship extending along one edge of said open side and directed toward an opposite edge thereof, a pair of air circulating means respectively connected to said nozzles for simultaneously forcing air outwardly thereof in a pair of adjoining layers across said open side of said compartment, and means for conditioning the air forced through the one of said nozzles that is adjacent the interior of said compartment, and] *according to claim 11 including:* (*g*) an elongated piling stud projecting upwardly from adjacent said one nozzle into the interior of said compartment for preventing the piling of articles in a position interfering with the issuing of said layers of air from said nozzles.

*16. The method of maintaining a predetermined temperature below ambient temperature within a compartment and isolating the interior of said compartment from the influence of ambient temperature which compartment has a generally vertically extending open side defined by a pair of horizontally extending, spaced, opposed edges, a rear wall in spaced, opposed relation to said open side, and spaced, opposed top and bottom walls respectively ex-*

*tending from said edges to said rear wall, said method comprising the steps of:*

*(a) simultaneously discharging a pair of parallel, contacting layers of air across said open side from one of said edges to the other at conditions which prevent substantial entrainment therebetween;*

*(b) one layer of said pair being approximately at said predetermined temperature and defining a substantially continuous inner air curtain extending across said open side between said pair of edges and next to said interior and the other layer of said pair being at a temperature between ambient temperature and said predetermined temperature and defining a continuous outer air curtain adjacent the side of said one layer outwardly of said interior;*

*(c) circulating a portion of the air of said one layer within said interior thereby refrigerating said compartment to said predetermined temperature; and*

*(d) refrigerating the air of said one layer to maintain it at approximately said predetermined temperature and then conducting it to said one of said edges for discharge back across said open side to said other of said edges.*

*17. In the method as defined in claim 16: (e) after said air of said one layer is refrigerated and before it is discharged back across said open side, conducting the air of said one layer in a closed path separate from said other air layer across and in contact with said rear, top and bottom walls to assist in maintaining said predetermined temperature within said interior.*

*18. In the method as defined in claim 16: (e) discharging said pair of parallel contacting layers of air across the open side of said compartment at substantially equal speeds between 500 and 4000 feet per minute.*

*19. In the method of claim 16: (e) said conditions which prevent entrainment between said layers being the discharge thereof across said open side at substantially equal speeds.*

*20. A refrigerated upright display case comprising:*

*(a) a compartment having a generally vertically extending open side defined by a pair of horizontally extending, spaced, opposed edges, a rear wall in spaced, opposed relation to said open side and spaced, opposed top and bottom walls respectively extending from said edges to said rear wall;*

*(b) a pair of elongated nozzles in parallel, side-by-side relationship extending continuously along the length of one of said edges directed toward the other of said edges;*

*(c) a pair of air circulating means each having an input side and an output side;*

*(d) a first air conduit connecting the output side of one of said air circulating means with the one of said nozzles adjacent the interior of said compartment and a second air conduit separate from said first air conduit connecting the output side of the other of said air circulating means to the other of said nozzles for respectively conducting air to said nozzles for issuing air therefrom in a pair of adjoining curtains across said open side;*

*(e) a return conduit connecting the other said edge with the input side of said one air circulating means for conducting the curtain of air issuing from said one nozzle to said one air circulating means; and*

*(f) air refrigerating means for refrigerating the air circulated by said one air circulating means;*

*(g) said first air conduit and said return conduit extending around and in contact with said rear, top and bottom walls to assist in maintaining the temperature of the air within the compartment at approximately the temperature of the air circulated by said one air culating means.*

*21. The display case of claim 20, in which: (h) said rear top and bottom walls are imperforate so that no air circulates from said first conduit and said return conduit through said rear, top and bottom walls into said compartment.*

References Cited

The following references, cited by the Examiner, are of record in the patended file of this patent or the original patent.

UNITED STATES PATENTS

| | | | |
|---|---|---|---|
| 935,850 | 10/1909 | Kirk | 98—36 |
| 983,877 | 2/1911 | Cummings | 98—36 |
| 2,241,854 | 5/1941 | Hall | 62—256 |
| 2,516,432 | 7/1950 | Spencer | 98—36 |
| 2,593,702 | 4/1952 | Schneible | 98—115 |
| 2,775,187 | 12/1956 | McClurlsen | 62—256 |
| 2,836,039 | 5/1958 | Weber | 62—256 |
| 2,855,762 | 10/1958 | Zehnder | 62—256 |

FOREIGN PATENTS

| | | | |
|---|---|---|---|
| 740,069 | 11/1955 | Great Britain | 98—36 |

WILLIAM J. WYE, Primary Examiner

U.S. Cl. X.R.

62—256, 285; 98—36, 115